United States Patent
Rozelle et al.

(10) Patent No.: US 6,330,105 B1
(45) Date of Patent: Dec. 11, 2001

(54) DOUBLE-PASS FULLY ISOLATED BROADBAND OPTICAL SIGNAL SOURCE FOR FIBER OPTIC INTERFEROMETRIC SENSORS

(75) Inventors: David M. Rozelle, Woodland Hills; Ronald J. Michal, Wrightwood; Leo K. Lam, Calabassas; John F. Cappi, Canoga Park, all of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/087,350

(22) Filed: May 29, 1998

(51) Int. Cl.[7] .................................. G02F 1/01; G02B 6/16
(52) U.S. Cl. ........................... 359/347; 359/337; 356/460; 356/477; 372/6
(58) Field of Search ..................... 359/337, 341, 359/347; 372/6; 356/460, 477

(56) References Cited

U.S. PATENT DOCUMENTS

| | | | |
|---|---|---|---|
| 4,186,353 | * 1/1980 | Boutineau | 359/347 |
| 4,637,255 | 1/1987 | Martin | 73/517 R |
| 4,792,956 | 12/1988 | Kamin | 372/29 |
| 4,842,358 | 6/1989 | Hall | 350/96.15 |
| 4,887,900 | 12/1989 | Hall | 356/350 |
| 4,890,922 | 1/1990 | Wilson | 356/350 |
| 4,915,503 | 4/1990 | Pavlath | 356/350 |
| 4,938,556 | 7/1990 | Digonnet et al. | 350/96.15 |
| 4,997,282 | 3/1991 | Pavlath | 356/350 |
| 5,037,205 | 8/1991 | Pavlath | 356/350 |
| 5,119,229 | 6/1992 | Grasso et al. | 359/341 |
| 5,177,562 | 1/1993 | Wysocki et al. | 356/350 |
| 5,231,465 | 7/1993 | Huang et al. | 356/350 |
| 5,311,603 | * 5/1994 | Fidric | 372/6 |
| 5,331,404 | * 7/1994 | Moeller et al. | 356/350 |
| 6,122,095 | * 9/2000 | Fatehi | 359/377 |

OTHER PUBLICATIONS

Delavaux et al, IEEE Photonics Tech. Letters, 190 3, vol. 6, PP 376–9, Mar. 6, 1994.*

* cited by examiner

Primary Examiner—Nelson Moskowitz
(74) Attorney, Agent, or Firm—Lynn & Lynn

(57) ABSTRACT

A pump light source provides pump light to an optical fiber arranged to guide the pump light to a first optical isolation device. Light output by the first optical isolation device is input to a wavelength division multiplexer. A gain fiber is connected to the wavelength division multiplexer and arranged to be optically pumped by the pump light such that the gain fiber emits broadband light that propagates to the wavelength division multiplexer. An output optical fiber is connected to the wavelength division multiplexer and arranged to guide a portion of the broadband light emitted by the gain fiber to a second optical isolation device for input to a fiber optic rotation sensor.

10 Claims, 3 Drawing Sheets

DOUBLE-PASS FULLY ISOLATED BROADBAND OPTICAL SIGNAL SOURCE FOR FIBER OPTIC INTERFEROMETRIC SENSORS

BACKGROUND OF THE INVENTION

This invention relates generally to an optical signal source for a fiber optic interferometric sensor. More particularly, this invention relates to an optical signal source for a fiber optic rotation sensor. Still more particularly, this invention relates to an optical signal source that includes a gain fiber that is optically pumped to produce a broadband optical signal. The invention provides apparatus for eliminating backward reflections of the pump light in a double-pass optical pumped gain fiber.

A double-pass optical pumped gain fiber produces greater signal intensity than can be obtained with a single pass of the pump light through a gain fiber. The gain fiber normally is doped with erbium, that produces gain in the optical signal frequency used in fiber optic rotation sensors.

However, use of a double-pass broadband fiber source in a fiber optic gyroscope has been limited. Problems encountered with double-pass optical pumping include gain depletion within the erbium fiber due to feedback from the gyro, crosstalk between gyro axes and the onset of lasing when pumping the erbium doped fiber with an intense pump laser diode in order to get a high power broadband fiber source. This lasing problem becomes more significant when the erbium fiber is made of a short length. Short length double-pass systems are desirable when trying to minimize effects due to exposure of the erbium fiber to ionizing radiation.

The typical broadband fiber source used in fiber optic gyros is a reverse pumped, single-pass fiber source. This configuration uses a laser diode that emits light at a given wavelength. This light is directed through a wavelength division multiplexer, WDM, that has two input leads and two output leads. One of the output leads of the WDM is physically connected to a length of erbium doped fiber, EDF. The EDF is terminated at one end with an angle capillary tube that keeps the light from being reflected back into the fiber. The EDF has a core that has been doped such that spontaneous emission occurs when light of a specific wavelength and sufficiently high intensity is launched into the core. This emission occurs in both directions of the EDF. In the reverse pumped single-pass configuration, light from the WDM is directed into the EDF. The EDF then emits light in both directions. The forward directed light exits the EDF through the angled capillary in such a way that it cannot be reflected back into the fiber. This light is lost to the system.

The light emitted in the reverse direction is directed back towards the WDM. This light is at a different wavelength from the pump light introduced by the laser diode. The WDM typically is optimized to separate the two wavelengths. Light from the EDF is at a wavelength such that it gets coupled into the fiber leg that is not connected to the laser diode. This light, which is broadband in nature, is then coupled into the fiber optic gyro.

To change this configuration to a double-pass system, the angled capillary is replaced with a reflector that preferably is a dichroic mirror. The reflector may alternatively be a Bragg grating or a straight cleave on the end of the optical fiber. The dichroic mirror causes the light in the forward direction to be reflected back in the reverse direction. This has the advantages that a shorter length of EDF can be used without losing efficiency, more power can be realized from the broadband fiber source for a given pump power, and the wavelength of the broadband source is more stable over temperature.

The problems as stated above with a double-pass configuration arise when the source is used as the optical signal source for a fiber optic rotation sensor. Half the light from the gyro is directed back into the broadband source because the gyro uses a fiber optic multiplexer (MUX) to separate the input light from the output light. This MUX is typically a 50/50 optical coupler. The light that is directed back into the broadband source acts to reduce the efficiency of the erbium fiber by a process called gain depletion. This problem is encountered with both the single reverse pump and double-pass configurations.

The second problem encountered is especially prevalent in the double-pass configuration. When all three fiber optic gyros are tied together for use as a three-axis inertial measurement unit, IMU, all three axes use the same broadband light source. This allows for a significant cost savings since three individual light sources are not needed. In a double-pass configuration with a mirror at the end of the EDF the light from one gyro that is reflected back due to the feedback described above can be reflected back into any one of the three axes. This creates a cross-coupling error term for each of the three gyros.

A third problem arises especially when trying to use the double-pass broadband source in a high power mode. In this case back reflections in the erbium gain fiber create etalons that collapse the broadband spectrum into a very narrow spectrum. This condition is unstable and introduces bias and scale factor instabilities into the gyro. Furthermore when the spectrum collapses the coherence length of the source becomes very long that allows for the introduction of polarization non-reciprocal (PNR) bias errors.

There is a need in the art for a double-pass optically pumped optical signal source that does not have backward reflections of the pump light into the gain fiber. To correct these problems back-reflections into the erbium-doped fiber must be eliminated.

SUMMARY OF THE INVENTION

This invention is directed to a fiber optic signal source that overcomes difficulties with the prior art by eliminating back-reflections in the gain fiber.

An optical signal source according to the present invention comprises a pump light source and an optical fiber arranged to receive pump light from the pump light source. A first optical isolation device is connected to the optical fiber. Light output by the first optical isolation device is input to a wavelength division multiplexer. A gain fiber is connected to the wavelength division multiplexer and arranged to be optically pumped by the pump light such that the gain fiber emits broadband light that propagates to the wavelength division multiplexer. An output optical fiber is connected to the wavelength division multiplexer and arranged to guide a portion of the broadband light emitted by the gain fiber to a second optical isolation device. After passing through the second optical isolation device, the optical signal is then input to a fiber optic rotation sensor.

The gain fiber preferably comprises a length of optical fiber doped with erbium.

The optical signal source preferably includes a reflector connected to an end of the gain fiber such that both forward emitted light and backwards emitted light propagate in the gain fiber to the wavelength division multiplexer for introduction into the output fiber. The reflector preferably is formed as a dichroic mirror.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

This disclosure describes an apparatus and a method for making and using an improved double-pass optical signal source for a fiber optic interferometric sensor system. Specific details are disclosed to provide a thorough description of the invention. However, it will be apparent that the present invention may be practiced without these specific details. Well-known components of the optical signal source according to the present invention are shown in block diagram form, rather than in detail, to avoid unnecessarily obscuring the invention.

Figure 1:
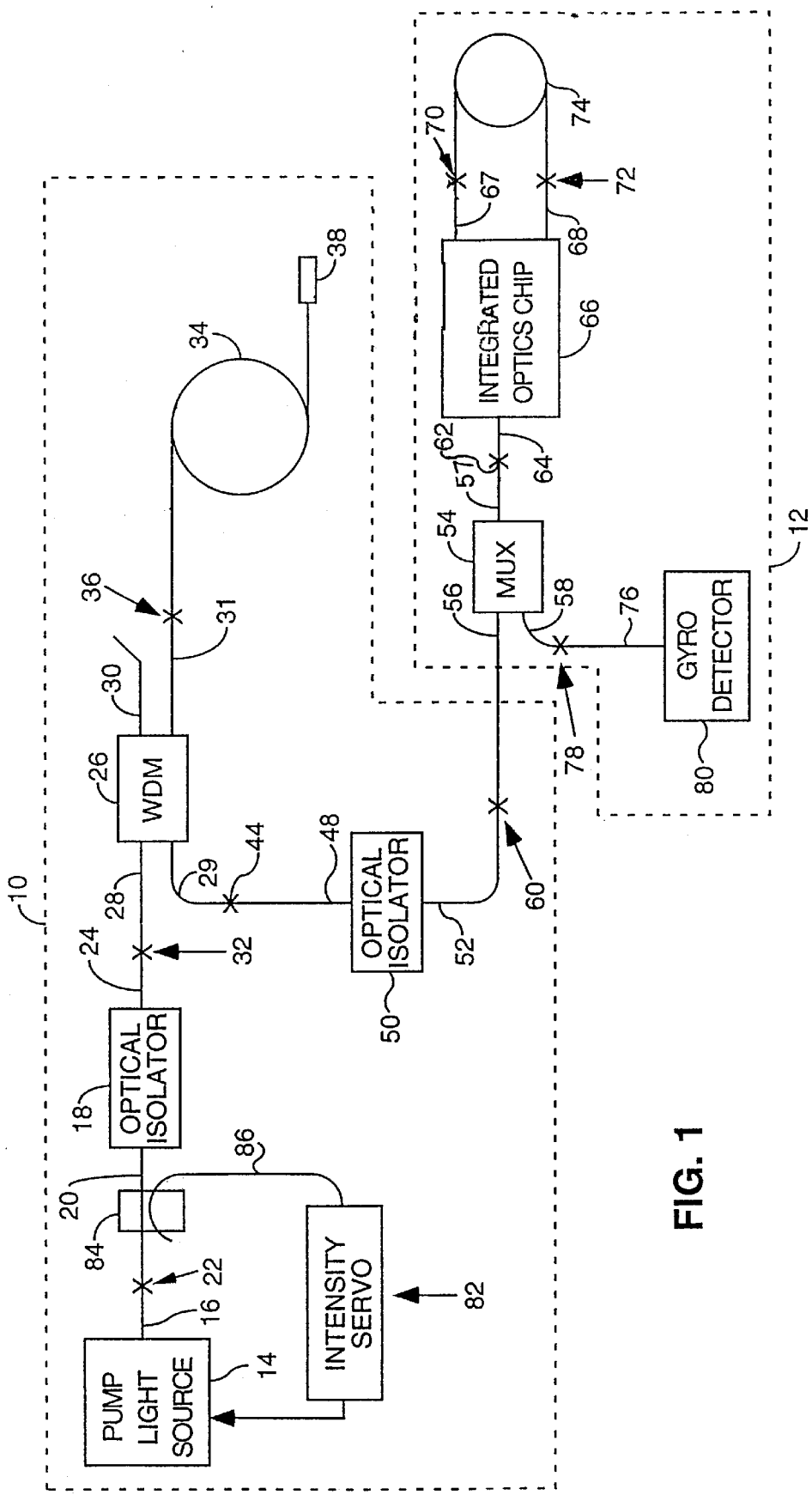
FIG. 1 illustrates an improved optical signal source according to the present invention.

FIG. 1 illustrates a reverse pumped, double-pass optical signal source 10 according to the present invention. The optical signal source 10 is arranged to provide optical signals to a fiber optic rotation sensor 12.

The optical signal source 10 includes a pump light source 14, which preferably comprises a laser diode, arranged to provide pump light to an optical fiber 16. An optical isolator 18 has an optical fiber pigtail 20 that is connected to the optical fiber 16 at a splice 22. The pump light propagates to the optical isolator 18 and exits the isolator 18 via an optical fiber pigtail 24.

A WDM coupler 26 has optical fiber pigtails 28–31 extending therefrom. The pigtail 28 is connected to the pigtail 24 via a splice 32 so that after passing through the optical isolator 18, the pump light then propagates to the WDM coupler 26. The WDM coupler 26 guides the pump light into a gain fiber 34 that is connected end-to-end with the optical fiber pigtail 31 via a splice 36.

The pump light has a wavelength of about 1480 nm in a preferred embodiment of the invention. The gain fiber 34 typically is an erbium-doped fiber, which is well-known in the art. The erbium-doped gain fiber 34 has a three level transition that produces a broadband optical signal having a wavelength centered at 1550 nm. U.S. Pat. No. 5,231,465, issued Feb. 8, 1991 to Phillips et al. and U.S. Pat. No. 5,119,229 issued Jun. 2, 1992 to Grasso et al. disclose the use of erbium-doped cores to provide optical signal in an optical fiber. The disclosures of U.S. Pat. Nos. 5,231,465 and 5,119,229 are hereby incorporated by reference into this disclosure.

The gain fiber 34 absorbs part of the pump light and emits light propagating lengthwise in both directions in the gain fiber 34. Light emitted in the direction of propagation direction of the pump light is referred to as forward light. Light emitted by the gain fiber 34 opposite in direction to the direction of propagation of the pump light is referred to as reverse light. The forward light reflects from a reflector 38 which terminates the gain fiber 34. The reflector 38 preferably is a dichroic mirror, but may be a Bragg grating or a straight cleave on the end of the optical fiber. The dichroic mirror 38 causes the light emitted in the forward direction to be reflected back in the reverse direction so that both the reverse light and the forward light are directed to the WDM coupler 26. The pump light does not reflect from the dichroic mirror 38.

The WDM coupler 26 directs the light emitted from the gain fiber 34 to the fiber optic rotation sensor 12 via the optical fiber pigtail 29. The pigtail fiber 29 is connected via a splice 44 to a fiber optic pigtail 48 that serves an input to an isolator 50. The optical isolator 50 provides an optical output to a fiber optic pigtail 52.

After passing through the isolator 50, the optical signal propagates to a multiplexer 54. The multiplexer 54 includes three optical fiber pigtails 56–58. The output fiber optic pigtail 52 of the optical isolator 50 is spliced to the optical fiber 56 at a splice 60. The optical signal from the optical signal source 10 then passes through the multiplexer 54 to the optical fiber pigtail 57. A splice 62 connects the multiplexer pigtail 57 to a pigtail 64 that is connected multifunction integrated optics chip (MIOC) 66, which includes well-known components used to form, and process the counter-propagating waves used in fiber optic rotation sensor systems. Suitable MIOC structures are disclosed in U.S. Pat. Nos. 4,915,503 (Pavlath); 4,997,282 (Pavlath); 5,037,205 (Pavlath), all of which are assigned to Litton Systems, Inc. The disclosures of U.S. Pat. Nos. 4,915,503; 4,997,282; 5,037,205 are hereby incorporated by reference into this disclosure.

The MIOC 66 is connected to optical fiber pigtails 67 and 68. A pair of splices 70 and 72 connect the MIOC pigtails 67 and 68, respectively, to a fiber optic sensing coil 74. The MIOC 66 processes light input form the optical signal source to provide counter-propagating waves to the fiber optic sensing coil 74. Rotation of the fiber optic rotation sensor 12 about a line perpendicular to the plane of the sensing coil 74 produces a phase difference in the counter-propagating waves by means of the Sagnac effect. After traversing the sensing coil 74, the counter-propagating waves combine in the MIOC 66 and form an interference pattern. The combined counter-propagating waves then exit the MIOC 66 and enter the multiplexer 54. The optical fiber pigtail 58 of the multiplexer 54 then guides the combined waves to a fiber 76 that is connected to the pigtail 58 via a splice 78. The optical fiber 76 then guides the combined counter-propagating waves to a photodetector 80. The photodetector 80 produces electrical signals that indicate the intensity of the interference pattern produced by combining the waves that have propagated through the sensing coil. Signal processing circuitry (not shown) then may be used to measure rotation of the sensing coil.

The isolator 50 acts to allow light to travel towards the MIOC 66 but stops light from propagating back toward the broadband light source 10.

Suitable structures for forming the optical isolators 18 and 50 are well-known in the art and are not described in detail. The isolators 18 and 50 may include several micro-optic bulk components. In a preferred form the isolator 50 has two fiber pigtails, a collimating lens on the input, a birefringent element, a Faraday rotator, a second birefringent element and a lens to couple the light back into the output fiber pigtail. Light entering the isolator is first collimated and then split into ordinary and extraordinary beams. Each of these beams are rotated 45° by the Faraday rotator. The two beams then enter the second birefringent element that has been aligned at 45° to the first element that allows the light beams to pass through. The light beams are then coupled into the output fiber pigtail. Light entering the isolator 50 from the reverse direction gets rotated by the Faraday rotator in non-reciprocal fashion and is rejected by the first birefringent element. Rejection of 40 to 60 dB is achievable with this type of an optical isolator. The optical isolator can be made with micro-bulk optic components or thin film components.

A single isolator configuration is not sufficient to stop lasing in a high power double-pass EDF configuration. Even with the use of the WDM coupler 26 to isolate the pump light source 14 from the EDF 34, a small amount of light from the EDF 34 can be reflected back towards the laser diode 12. Because of the internal coupling components utilized by the laser diode pigtail, a reflection from the laser diode 12 to the EDF 34 is possible, especially when a high-intensity pump is used. To overcome this problem, the optical signal source according to the present invention includes the isolator 18 in addition to the isolator 50.

Figure 2:
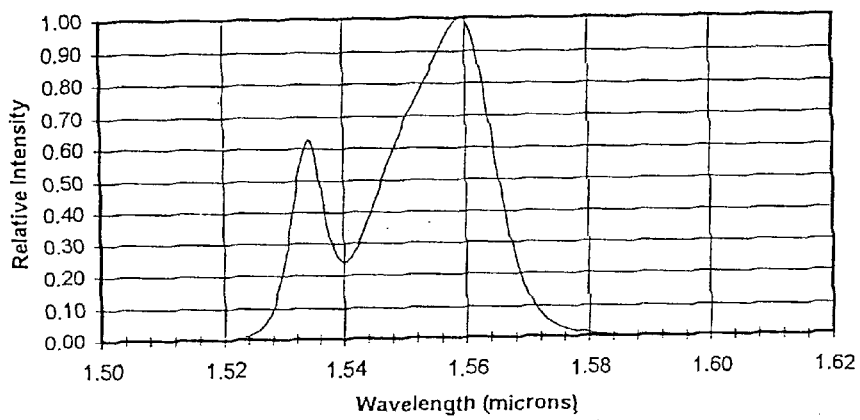
FIG. 2 graphically illustrates the spectrum output by a prior art single-pass fiber optic optical signal source.

FIGS. 2–5 illustrate the effect of forming the fiber optic signal source to include the isolators 18 and 50. FIG. 2 shows the spectrum for a single-pass broadband fiber source that is being pumped with high pump power (>50 milliwatts). The data for FIG. 2 is for an optical circuit that includes the isolator 50, but not the isolator 18. It should be noted that the single-pass light source does not include the dichroic mirror 38, but instead typically includes an angled capillary that guides the forward emitted light out of the gain fiber 34. This spectrum shown in FIG. 2 is typical for broadband fiber sources operating near saturation.

Figure 3:
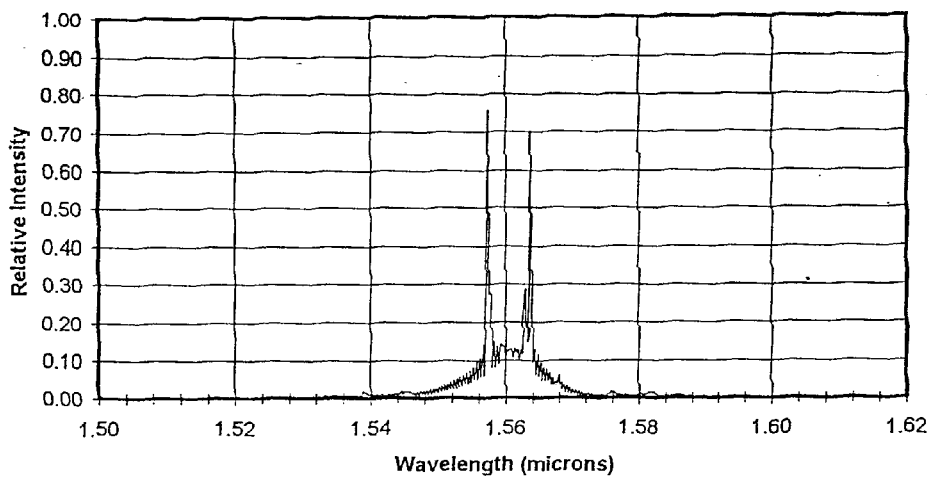
FIG. 3 graphically illustrates the spectrum of a double-pass fiber optic optical signal source without isolators that includes a straight cleaved fiber end to form a mirror.

FIG. 3 is a spectrum that represents a double-pass light source (not shown) having the isolator 50 and having the reflector 38 formed as a straight cleave in the gain fiber 34 instead of the preferred dichroic mirror. A straight cleave typically gives a 4% reflection of the forward light to create a double pass system. FIG. 3 shows that the spectrum collapses into two narrow peaks that are unusable in a fiber optic gyroscope.

Figure 4:
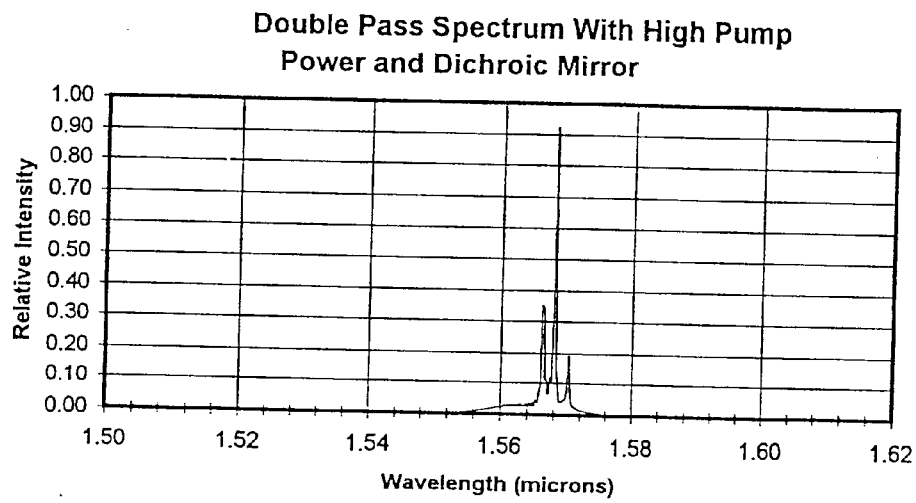
FIG. 4 graphically illustrates the spectrum of a double-pass fiber optic optical signal source without isolators that includes a dichroic mirror.

FIG. 4 is a spectrum obtained by omitting the isolator 18 from FIG. 1. The dichroic mirror reflector creates an efficient double-pass configuration which has a spectrum that also collapses to several narrow peaks.

Figure 5:
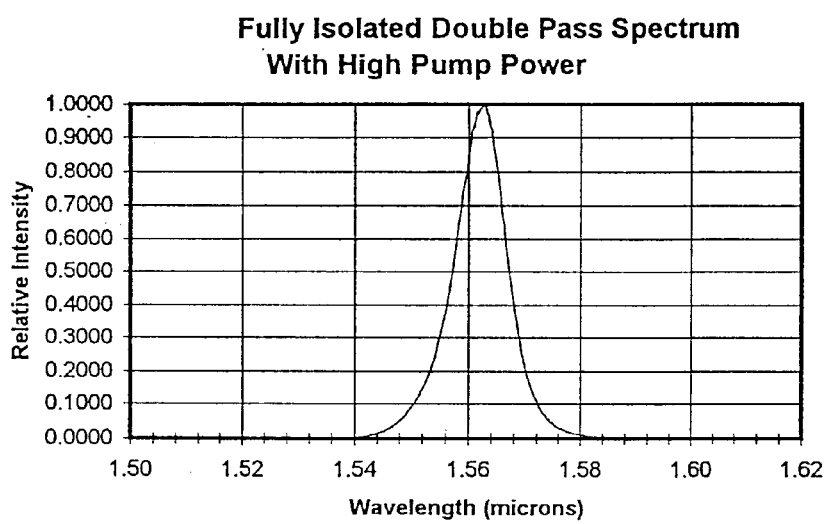
FIG. 5 graphically illustrates the spectrum of the fiber optic optical signal source according to the embodiment of the invention shown in FIG. 1.

FIG. 5 shows the spectrum obtained from the optical signal source shown in FIG. 1. Including the isolator 18 between the pump light source 14, preferably a laser diode, and the WDM coupler 26 removes reflections from the pump light source 14 and thus spoils the cavity that creating the lasing that produced the multiple peaks in the optical signal output. The result of including the two optical isolators 18 and 50 in the system is the single broad peak spectrum of FIG. 5. The single peak spectrum has the advantage of adding scale stability to the gyro when the source is exposed to ionizing radiation.

The fiber optic rotation sensor architecture of FIG. 1 may include a servo system 82 arranged to maintain the intensity and wavelength of the pump light at constant values. The servo system eliminates the effect of temperature variations on the output of the pump light source 14. The servo system 82 may include an optical coupler 84 arranged to tap a small amount (1% for example) of the pump light out to the optical fiber 18 into an optical fiber 86. The servo system receives the light tapped out of the optical fiber 18 and produces feedback signals that are input to the pump light source 14 to stabilize either one or both of intensity and wavelength.

Suitable intensity servo systems are disclosed in U.S. Pat. No. 4,792,956 (Kamin); U.S. Pat. Nos. 4,842,358 (Hall); 4,887,900 (Hall) and U.S. Pat. No. 4,890,922 (Wilson), which are assigned to Litton Systems, Inc. The disclosures of U.S. Pat. Nos. 4,792,956; 4,842,358; 4,887,900 and 4,890,922 are hereby incorporated by reference into this disclosure.

The coupler 84 in the servo system may be located at various positions in the fiber optic rotation sensor architecture. The coupler may be located at point A after the isolator 18 in the optical fiber 28 or at point B after the WDM coupler 26 in the optical fiber pigtail 31.

As an alternative to the inclusion of an optical isolator in the fiber line between the pump laser diode 14 and the WDM coupler 26 to suppress the reflection of 1.56 $\mu$m light from the front facet of the laser diode, a long period grating that provides loss at 1.56 $\mu$m by diverting the light to the cladding could be used. This has the advantages of (a) lower transmission loss at the 1480 nm pump wavelength than an in-line optical isolator, (b) a lower cost, (c) requiring very little volume and weight, and (d) preserving the all-fiber architecture and reliability. The use of a long period grating is particularly attractive if a Bragg fiber grating has to be used to control the pump wavelength of the laser diode as the two gratings can be written on the same fiber.

The isolation ratio at 1.56 $\mu$m of a long period grating may not be as good as the isolator. However, because the front facet of the laser diode and a double-pass of the WDM already provide a return loss of at least −30 dB, a total rejection of −50 dB is readily attainable with a 10 dB long period grating and is more than adequate to suppress oscillation.

An exemplary embodiment of the invention is disclosed herein to explain how to make and use the invention. The described embodiments are to be considered in all respects as exemplary and illustrative rather than restrictive. Therefore, the appended claims rather than the foregoing descriptions define the scope of the invention. All modifications to the embodiments described herein that come within the meaning and ranges of equivalence of the claims are embraced within the scope of the invention.

What is claimed is:

1. A fiber optic interferometric sensor system, comprising:
   a pump light source;
   an optical fiber arranged to receive pump light from the pump light source;
   a first optical isolation device connected to the optical fiber, the first optical isolation device being arranged to allow only one-way propagation from the pump light source;
   a wavelength division multiplexer arranged to receive pump light that passes through the optical isolation device;
   a gain fiber connected to the wavelength division multiplexer and arranged to be optically pumped by the pump light such that the gain fiber emits a broadband optical signal that propagates to the wavelength division multiplexer;
   an output optical fiber connected to the wavelength division multiplexer and arranged to guide a portion of the broadband optical signal emitted by the gain fiber;
   a second optical isolation device connected to the output optical fiber, the second optical isolation device being arranged to allow only one-way propagation from the output optical fiber; and a fiber optic interferometric sensor connected to the second optical isolation device to receive the broadband optical signals guided by the output optical fiber.

2. The fiber optic interferometric sensor system of claim 1 wherein the gain fiber comprises a length of optical fiber doped with erbium.

3. The fiber optic interferometric sensor system of claim 2, further comprising a reflector connected to an end of the gain fiber such that both forward emitted light and backwards emitted light propagate in the gain fiber to the wavelength division multiplexer for introduction into the output fiber.

4. The fiber optic interferometric sensor system of claim 3 wherein the reflector is formed as a dichroic mirror.

5. A method for forming a fiber optic interferometric sensor system, comprising the steps of:

providing a pump light source;

arranging an optical fiber to receive pump light from the pump light source;

connecting a first optical isolation device to the optical fiber with the first optical isolation device being arranged to allow only one-way propagation from the pump light source;

arranging a wavelength division multiplexer to receive pump light that passes through the optical isolation device;

connecting a gain fiber to the wavelength division multiplexer and arranging the gain fiber to be optically pumped by the pump light such that the gain fiber emits broadband light that propagates to the wavelength division multiplexer;

connecting an output optical fiber to the wavelength division multiplexer and arranging the output optical fiber to guide a portion of the broadband light emitted by the gain fiber;

connecting a second optical isolation device to the output optical fiber with the second optical isolation device being arranged to allow only one-way propagation from the output optical fiber; and connecting a fiber optic interferometric sensor to the second optical isolation device to receive the broadband optical signals guided by the output optical fiber.

6. The method of claim 5 including the step of forming the gain fiber to comprise a length of optical fiber doped with erbium.

7. The method of claim 6, further comprising the step of connecting a reflector to an end of the gain fiber such that both forward emitted light and backwards emitted light propagate in the gain fiber to the wavelength division multiplexer for introduction into the output fiber.

8. The method of claim 7 including the step of forming the reflector as a dichroic mirror.

9. The fiber optic interferometric sensor system of claim 1, further comprising an intensity servo loop connected between the first optical isolation device and the pump light source to maintain the pump light at a constant intensity.

10. The fiber optic interferometric sensor system of claim 1 wherein the fiber optic interferometric sensor comprises a fiber optic rotation sensor.

* * * * *